United States Patent [19]

Dong

[11] Patent Number: 5,767,448
[45] Date of Patent: Jun. 16, 1998

[54] SEALING DEVICE

[75] Inventor: Wesley B. Dong. Belmont, Calif.

[73] Assignee: Raychem Corporation. Menlo Park, Calif.

[21] Appl. No.: 723,055

[22] Filed: Sep. 30, 1996

Related U.S. Application Data

[63] Continuation-in-part of PCT/US96/13803 Aug. 27, 1996.

[51] Int. Cl.$^6$ .................................................. H01R 4/22
[52] U.S. Cl. .......................... 174/74 A; 174/77 R; 174/82; 174/93
[58] Field of Search .............................. 174/76, 77 R, 174/74 A, 74 R, 82, 93

[56] References Cited

U.S. PATENT DOCUMENTS

| | | | |
|---|---|---|---|
| 3,852,512 | 12/1974 | Herrmann, Jr. | 174/19 |
| 3,858,144 | 12/1974 | Bedard et al. | 338/22 R |
| 3,861,029 | 1/1975 | Smith-Johannsen et al. | 29/611 |
| 4,017,715 | 4/1977 | Whitney et al. | 219/553 |
| 4,186,986 | 2/1980 | Shoemaker | 339/114 |
| 4,242,573 | 12/1980 | Batliwalla | 219/528 |
| 4,332,975 | 6/1982 | Dienes | 174/76 |
| 4,334,148 | 6/1982 | Kampe | 219/553 |
| 4,334,351 | 6/1982 | Sopory | 29/611 |
| 4,426,339 | 1/1984 | Kamath et al. | 264/22 |
| 4,459,473 | 7/1984 | Kamath | 219/553 |
| 4,574,188 | 3/1986 | Midgley et al. | 219/549 |
| 4,610,738 | 9/1986 | Jervis | 156/49 |
| 4,647,717 | 3/1987 | Uken | 174/84 C |
| 4,721,832 | 1/1988 | Toy | 174/87 |
| 4,751,350 | 6/1988 | Eaton | 174/74 A |
| 4,847,447 | 7/1989 | Eiswirth et al. | 174/74 A |
| 4,859,809 | 8/1989 | Jervis | 174/92 |
| 4,877,943 | 10/1989 | Oiwa | 174/74 A |
| 4,924,034 | 5/1990 | Truesdale et al. | 174/74 A |
| 5,052,699 | 10/1991 | Tucker | 277/178 |
| 5,098,752 | 3/1992 | Chang et al. | 174/84 R |
| 5,111,032 | 5/1992 | Batliwalla et al. | 219/549 |
| 5,130,495 | 7/1992 | Thompson | 174/74 R |
| 5,313,019 | 5/1994 | Brusselmans et al. | 174/93 |
| 5,322,972 | 6/1994 | Fitch et al. | 174/77 R X |
| 5,516,985 | 5/1996 | Merkel et al. | 174/74 A |

FOREIGN PATENT DOCUMENTS

| | | |
|---|---|---|
| 0 322 160 | 6/1989 | European Pat. Off. |
| 0 392 089 | 10/1990 | European Pat. Off. |
| 2227617 | 8/1990 | United Kingdom |
| 2231735 | 11/1990 | United Kingdom |
| WO 93/17477 | 9/1993 | WIPO |
| WO 96/24975 | 8/1996 | WIPO |

*Primary Examiner*—Kristine L. Kincaid
*Assistant Examiner*—Marc D. Machtinger
*Attorney, Agent, or Firm*—Marguerite E. Gerstner; Herbert G. Burkard

[57] ABSTRACT

An apparatus for sealing a core of an elongate cable in which a polymeric core of an insulating or a conductive polymer is positioned between first and second elongate electrodes. The apparatus is a container which has a first portion with an open end into which the cable can be inserted and a second partially closed end which has first and second openings. The first portion also contains a sealant, e.g. a grease or a gel. A first removable guide tube is inserted through the first opening and a second removable guide tube is inserted through the second opening, the first and second guide tubes being suitable for insertion of the first and second elongate electrodes, respectively. The apparatus allows insertion of the elongate electrodes after the polymer has been removed from them, without allowing contact between the electrodes and the sealant.

18 Claims, 2 Drawing Sheets

SEALING DEVICE

CROSS-REFERENCE TO RELATED APPLICATIONS

This is a continuation-in-part of Application No. PCT/US96/13803, filed Aug. 27, 1996, the disclosure of which is incorporated herein by reference.

BACKGROUND OF THE INVENTION

1. Field of the Invention

This invention relates to sealing devices, particularly sealing devices for elongate cables such as elongate heating cables.

2. Introduction to the Invention

Elongate cables such as power cords and heating cables generally comprise elongate electrodes, e.g. wires, embedded in or surrounded by a polymeric material. The polymeric material may be electrically insulating, e.g. for power cables, or electrically conductive, e.g. for heating cables. When it is necessary to make an electrical connection to the embedded electrodes or wires, it may be possible to use to an insulation displacement connector to pierce the polymeric covering and contact the electrodes, but it is more common to remove or "strip" the polymeric material from the electrodes. The polymer-free electrodes can then be easily connected to another electrode or to an electrical connector. Under such circumstances, it may be desirable to seal the edge of the polymer at the point at which the stripped electrodes project from the polymer in order to provide electrical insulation, environmental protection and/or mechanical shielding. Many sealing methods and devices have been used to provide a suitable seal, including heat-recoverable tubing, end-caps, or boots; molded adhesive-filled boots; enclosures with gaskets or grommet seals; and wrapped tape. Such methods have had limitations because of their craft-sensitivity, difficulty of installation, limitation to a particular size or shape of cable, or requirement for special tools.

A further problem is encountered when the sealing device is filled with a sealant, e.g. a gel or a grease, which is intended to provide additional moisture resistance and insulation to the polymer. If the device is in the form of a container into which the polymer-free electrodes are inserted, it is difficult to avoid contacting the electrodes with the sealant. As a result, the electrodes may be contaminated with the sealant, making electrical contact to the electrodes more difficult and less reliable.

SUMMARY OF THE INVENTION

I have now found that the use of removable guide tubes in the sealing device allows insertion of polymer-free electrodes without contact with the sealant. In addition, the guide tubes decrease the likelihood of inadvertent crossing of the electrodes on insertion which would lead to short circuits, and decreases the chances of the wire electrode strands splaying apart (i.e. "birdcaging"). Furthermore, if the sealing device is made from a flexible material, e.g. silicone rubber, the guide tubes decrease the chances of the electrodes penetrating the material and thus creating a pinhole or site for moisture ingress. Thus, in a first aspect this invention provides an apparatus for sealing a core of an elongate cable comprising (A) first and second elongate electrodes, and (B) a polymeric core between said electrodes; said apparatus comprising a container which comprises (1) a first portion which
  (a) has a first open end into which the cable can be inserted, and a second partially closed end comprising (i) a first opening and (ii) a second opening, and
  (b) contains a sealant;
(2) a first removable guide tube which is inserted through the first opening and is suitable for insertion of the first elongate electrode; and
(3) a second removable guide tube which is inserted through the second opening and is suitable for insertion of the second elongate electrode.

In a second aspect, the invention provides an assembly which comprises (A) an elongate cable comprising
  (1) first and second elongate electrodes, and
  (2) a polymeric core between said electrodes; and
(B) an apparatus comprising a container which comprises
  (1) a first portion which
    (a) has a first open end into which the cable is inserted, and a second partially closed end comprising (i) a first opening and (ii) a second opening, and
    (b) contains a sealant;
  (2) a first removable guide tube which is inserted through the first opening and has inserted in it a polymer-free section of the first elongate electrode; and
  (3) a second removable guide tube which is inserted through the second opening and has inserted in it a polymer-free section of the second elongate electrode.

DETAILED DESCRIPTION OF THE INVENTION

Figure 1:
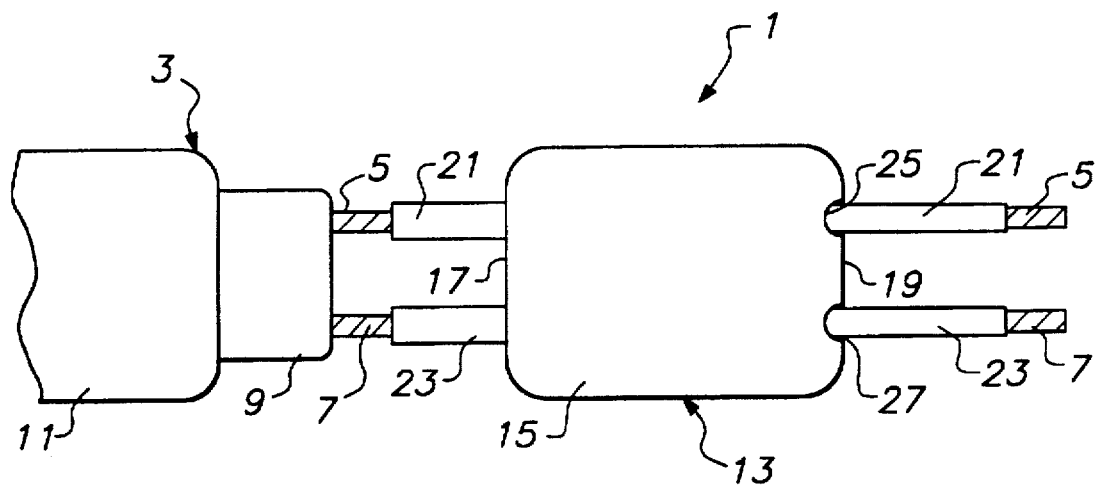
FIG. 1 is a top view of an apparatus of the invention.

The sealing apparatus of the invention can be used to seal the core of any elongate cable in which at least two elongate electrodes, e.g. wires, are separated by, and preferably surrounded by, a polymeric material, i.e. the core. The polymeric core may be an electrically insulating polymer or a conductive polymer, depending on the type of cable. For example, insulating polymers are used for power cables or cords and for grounded power leads. Conductive polymers are used in electrical heating cables such as self-limiting strip heaters. Elongate electrical heating cables particularly appropriate for use with this sealing apparatus are those which comprise first and second elongate electrodes, a plurality of resistive heating elements connected in parallel between the electrodes, and at least one insulating jacket surrounding the electrodes and heating elements. The insulating jacket is generally polymeric, in the form of a continuous polymer layer, although a polymeric braid or a polymer tape may be used. For some applications a polymeric insulating jacket is surrounded by a second layer, e.g. a second polymeric insulating layer such as a polyester tape, or a metallized tape such as aluminized polyester. The heating cable often comprises an optional metallic grounding braid surrounding the insulating jacket and the optional second layer. The metallic grounding braid serves to electrically ground the heating cable and also provides mechanical strength and abrasion resistance. When a metallic grounding braid is present, it is generally in the form of braided metal wires, although for applications in which flexibility is not critical, it is possible to use another type of metal layer, e.g. a sheath or metal tape. In some applications, the grounding braid itself is surrounded by an outer insulating jacket to provide environmental and electrical insulation to the heating cable. Particularly suitable heating cables are self-regulating strip heaters in which the electrodes are elongate wires and the heating elements comprise a conductive polymer composition. Heaters of this type are described in U.S. Pat. Nos. 3,858,144 (Bedard et al), 3,861,029 (Smith-Johannsen et al), 4,017,715 (Whitney et al), 4,242,573 (Batliwalla), 4,334,148 (Kampe), 4,334,351 (Sopory), 4,426,339 (Kamath et al), 4,459,473 (Kamath), 4,574,188 (Midgley et al), and 5,111,032 (Batliwalla et al), the disclosures of which are incorporated herein by reference. The heating cable generally has an approximately rectangular cross-section with two generally parallel faces, and thus the core is approximately rectangular, although other geometries, e.g. round, oval, or elliptical, can also be effectively sealed by the sealing device of the invention.

While the sealing apparatus is described herein as being used to seal the core separating two electrodes, it can also be used to seal a single electrode surrounded by a polymeric material.

The sealing apparatus comprises a container which comprises a first portion which contains a sealant and first and second removable guide tubes. The container can be made of a rigid or a flexible material. If rigid, the container is generally made from an insulated metal or ceramic but preferably comprises a polymer which has an impact strength of at least 5 foot-pounds when shaped into the final configuration as measured by such tests as UL 746C, the disclosure of which is incorporated herein by reference. Preferred polymers are of light weight, can be shaped by injection- or transfer-molding or similar processing techniques, and will withstand required intermittent use and continuous use temperatures. Appropriate polymers include polycarbonate, nylon, polyester, polyphenylene sulfide, polyphenylene oxide, and other engineering plastics. It is often desirable that the container be made of a flexible material so that it is able to expand and contract as the cable is exposed to a thermal cycle. If flexible, the container is preferably elastomeric, comprising, for example, a rubber such as ethylene/propylene/diene rubber, or a silicone rubber. For good thermal stability (i.e. up to 150° C., preferably up to 200° C.) and good solvent resistance, it is preferred that the elastomer be a silicone rubber or a fluorosilicone rubber. Appropriate fillers, including pigments and stabilizers, can be present in the material forming the container.

The container comprises a first portion which can be of any suitable shape and dimensions, but which comprises a first open end into which the cable, with its first and second electrodes stripped of polymer, can be inserted. In a preferred embodiment, the first portion has a generally tubular shape or cup shape with an interior surface and an exterior surface. The second end of the first portion is partially closed, but comprises first and second openings large enough for insertion of first and second removable guide tubes, respectively. The first and second openings can have any shape, e.g. round- or diamond-shaped, and preferably conform to the shape of the guide tubes. For some embodiments, it is desirable that the edges of the openings on the interior surface of the first portion be shaped, e.g. in a cone-shape projecting into the first portion, so as to provide a wiping edge when the guide tubes are removed. Additional openings may be present for use with additional elongate electrodes. It is also possible to have a first portion in which the opening of the open end is just large enough to accommodate one or more removable guide tubes which pass through the first portion and out openings in the second partially closed end. In this configuration, a single conductor, or multiple conductors, can be inserted through the guide tube and the guide tube then can be removed, to provide a bulkhead connector. A sealant can be present to surround the inserted conductor.

In a preferred embodiment, the first portion is attached at the second end to a second portion. The second portion comprises a first leg portion which is connected to the first opening and which is suitable for insertion of the first guide tube, and a second leg portion which is connected to the second opening and which is suitable for insertion of the second guide tube. The second portion may also comprise additional leg portions for connection to additional openings and insertion of any additional guide tubes. A transition region connecting the first and second portions of the container may be straight, or there may be a taper between the two portions (and, in some cases, extending into the first and second leg portions) to assist in positioning the guide tubes (and electrodes) properly. An interior edge in this transition region may be designed to act as a wiping edge to remove sealant. It is preferred that the first and second portions of the container are designed so that, when the cable, with elongate electrodes free of core material, is inserted as far as possible into the container, and the guide tubes have been removed, the electrodes are located in the first and second leg portions and extend therefrom, and the edge of the core is positioned next to the partially closed second end.

The first portion may comprise at least one rib on an interior surface which contacts the inserted cable, and which may wipe off sealant when the cable is removed from the container. The rib may extend around the entire inner circumference of the first portion, or it may be positioned on either the top or the bottom of the interior surface. Preferably the first portion comprises one or more pair of ribs which may be positioned opposite one another on opposing interior surfaces.

In a preferred embodiment, at least part of the exterior surface of the container, preferably the exterior surface of the first portion when the container is a flexible material, is surrounded by a band, preferably a rigid band which serves to provide adequate compression for different cable sizes. The band can be made of a metal, a ceramic, or a high strength polymer, e.g. an engineering plastic such as polyphenylsulfone or polyphenylene oxide. The thickness of the band is determined by the strength of the material from which it is made. The length of the band is sufficient to provide adequate compression (and often to cover the ribs on the interior of the first portion, if present), but not so great as to limit expansion of the container down its entire length.

The first portion contains a sealant which has sufficient viscosity to contact the inserted cable and, particularly for heating cables, maintain the contact during thermal cycling. In addition, the sealant acts to prevent moisture, fluids, and dust particles from contacting the cable end and acts as an electrical insulator. The sealant may be any suitable material, e.g. a grease, gel, adhesive, or mastic. Particularly preferred is a grease which has good thermal stability at temperatures up to 150° C., preferably up to 200° C. A grease is a solid or semifluid lubricant comprising a thickening agent in a liquid lubricant. Such greases often comprise fillers such as clays or silica. Greases based on silicones or fluoropolymers are preferred. Greases having a National Lubrication Grade Index of at least 2 are suitable for use. Preferred greases are thixotropic silicone pastes containing silica, and perfluoroalkylpolyether oil filled with a telomer of tetrafluoroethylene. It is important that the grease be compatible with the material comprising the first portion of the container so that no oils or fluids migrate from the grease to the other parts of the container to swell and/or soften it. Thus, it is preferred that a first portion comprising a fluorosilicone be used with a silicone paste or a perfluoroalkylpolyether lubricant, while a first portion comprising a silicone rubber be used with a perfluoroalkylpolyether lubricant but not a silicone paste. For some applications, it is preferred that the sealant comprise a gel, e.g. a thermosetting gel, e.g. silicone gel, in which crosslinks are formed through the use of multifunctional crosslinking agents, or a thermoplastic gel, in which microphase separation of domains serves as junction points. Disclosures of gels which may be suitable for use are found in U.S. Pat. Nos. 4,600,261 (Debbaut), 4,690,831 (Uken et al), 4,716,183 (Gamarra et al), 4,777,063 (Dubrow et al), 4,864,725 (Debbaut et al), 4,865,905 (Uken et al), 5,079,300 (Dubrow et al), 5,104,930 (Rinde et al), and 5,149,736 (Gamarra); and in International Pat. Publication Nos. W086/01634 (Toy et al), W088/00603 (Francis et al), W090/05166 (Sutherland), W091/05014 (Sutherland), and W093/23472 (Hammond et al). The disclosure of each of these patents and publications is incorporated herein by reference. The gel component is preferably placed in the first portion prior to use, and although the sealant can be applied by any means, for ease of manufacturing it is preferred that the sealant be pumpable.. The first portion is preferably filled to at least 30%, particularly at least 40%, especially at least 50% by volume with the sealant. The present invention is particularly useful when the sealant is a gel because the presence of the guide tubes prevents shearing of the gel when the conductors are inserted into the first portion, thus minimizing the chances of destroying the seal around the conductors. The choice of material and lubrication of the guide tubes allows minimal shear on the gel when the guide tubes are removed.

In order to aid in the insertion of the electrodes, first and second removable guide tubes are inserted through the first and second openings, respectively, and, if a second portion is present, through the first and second leg portions, respectively, as well. The first and second guide tubes comprise a rigid material, e.g. plastic, ceramic, glass, metal, or paper such as wax-coated cardboard. In this specification, the term "rigid" is used to mean a material, which, when formed into the shape of a guide tube, is self-supporting. The inner diameter of the first and second guide tubes is at least 1.1 x mm, preferably at least 1.2 x mm, particularly at least 1.3 x mm, in size, where x is the outer diameter of the first and second electrodes in millimeters. For ease of installation, it is preferred that the outer diameter of the guide tubes be smaller than the inner diameter of the first and second openings, as well as the inner diameter of the first and second leg portions, if present. However, if the container comprises a flexible material, and particularly when the container comprises a flexible material and the transition between the first and second portions comprises an internal tapered section near the junction of the first and second sections (i.e. in the transition region), the outer diameter of the guide tube may be sized so that the guide tubes are held in place by elastic force. Under these circumstances, the outer diameter of the guide tube may be slightly larger than the inner diameter of the opening. In addition, for an apparatus of this type, when the guide tubes are removed, the tapered section on the first and second leg portions acts to wipe the guide tubes clean of sealant. The guide tubes may be inserted into the first and second openings, and the first and second leg portions, and preferably through the first portion of the container as well, prior to inserting the electrodes. It is preferred that the guide tubes extend the entire length of the container and thus have a length at least 1.2 y mm, preferably at least 1.3 y mm, particularly at least 1.4 y mm, where y is the length of the container, including the length of the second portion if present. For some applications, in which there is insufficient space to easily slide the guide tubes completely from the container, it is possible to pre-score the guide tubes to allow them to be more readily removed in sections.

The apparatus of the invention is easy to use in a three step operation. The cable end is prepared by removing an appropriate length of polymeric core material from the elongate wires. The elongate wires are then inserted into the container through the guide tubes until the edge of the polymeric core contacts the partially closed second end of the first portion. The guide tubes are then removed by pulling them out from the second end of the first portion. As a result, the section of the electrodes protruding from the container will be clean and ready for electrical connection.

The apparatus of the invention can be used in an assembly which also comprises an elongate cable.

The invention is illustrated by the drawings in which FIG. 1 is a top view of sealing apparatus 1 of the invention. Elongate cable 3, in which first elongate electrode 5 and second elongate electrode 7 are embedded in polymeric core 9 and surrounded by insulating jacket 11, is inserted into container 13. In this embodiment, container 13 comprises first portion 15 which has first open end 17 and second partially closed end 19. First removable wire guide tube 21 and second removable wire guide 23 are inserted through first opening 25 and second opening 27, respectively. First and second electrodes 5,7 pass through first and second wire guides 21,23, respectively.

Figure 2:
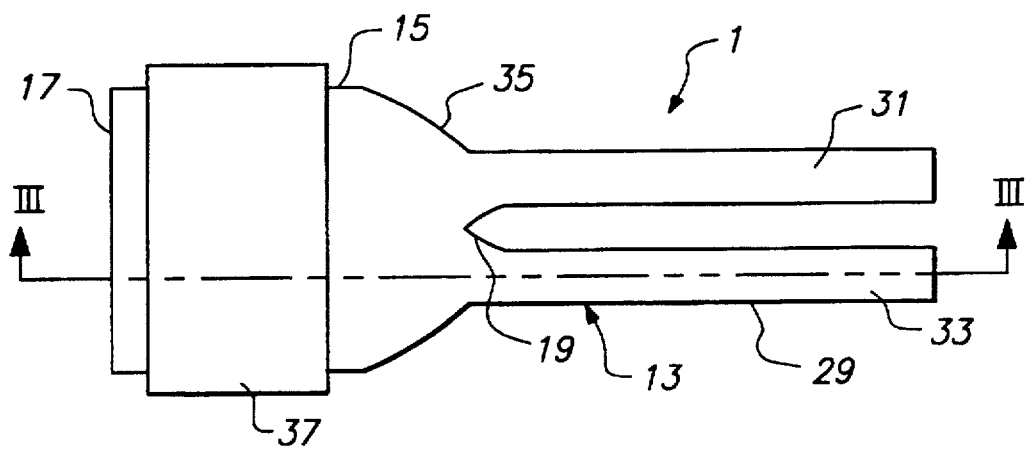
FIG. 2 is top view of another embodiment of an apparatus of the invention.

FIG. 2 is a top view of apparatus 1 (with guide tubes removed) in which container 13, which is a flexible material, is made of first portion 15 and second portion 29. Extending from second portion 29 are first leg portion 31 and second leg portion 33 which are joined at second partially closed end 19, and which are positioned so that first leg portion 31 extends from first opening 25 and second leg portion 33 extends from second opening 27. The transition region 35 between first and second portions 15,29 is tapered. Surrounding first portion 15 is rigid band 37, which may be held in place by a ridge or edge portion (not shown) around first open end 17.

Figure 3:
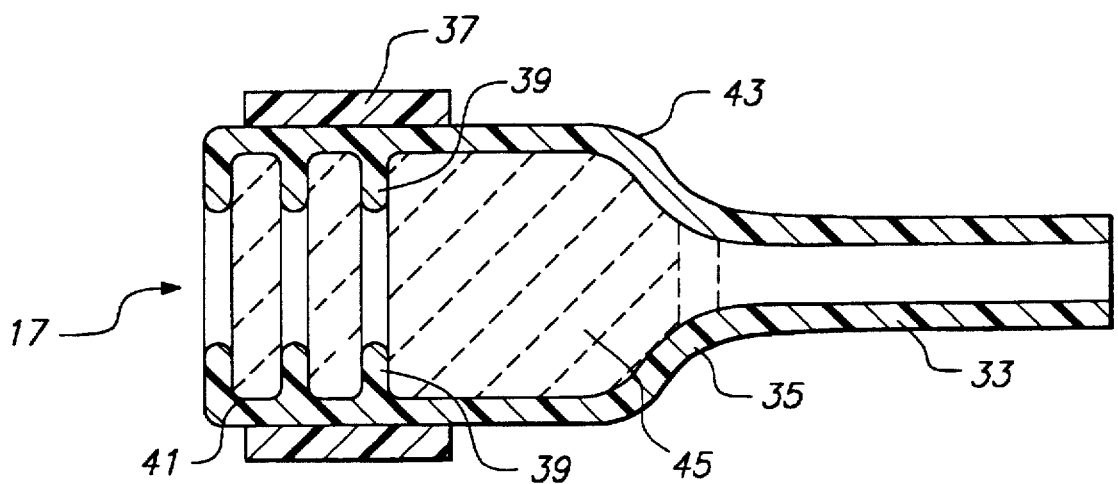
FIG. 3 is a cross-sectional view of the apparatus of FIG. 2 along line III—III.

FIG. 3 is a cross-sectional view of the apparatus of FIG. 2 along line III-III. Visible are ribs 39 which extend from interior surface 41. Surrounding exterior surface 43 is rigid band 37. Shown present in first portion 15 is sealant 45.

Figure 4:
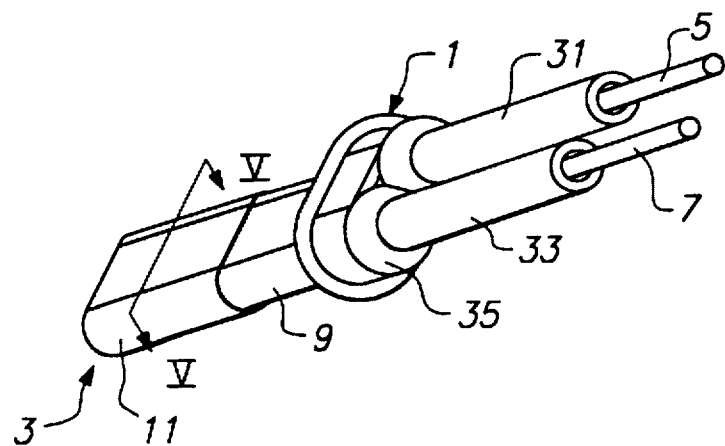
FIG.4 is a perspective view of an apparatus of the invention after an elongate cable has been inserted.
Figure 5:
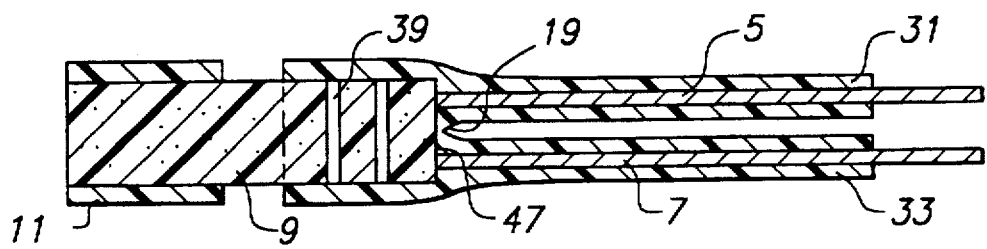
FIG. 5 is a cross-sectional view of the apparatus of FIG. 4 along line V—V.

FIG. 4 is a perspective view of apparatus 1 after elongate heating cable 3 has been inserted, and FIG. 5 is a cross-sectional view along line V—V. Core material, e.g. conductive polymer, has been removed from first electrode 5 and second electrode 7 prior to their placement in first and second leg portions 31 and 33, respectively. Core 9 has been inserted so that exposed end of core 47 is in contact with the interior surface of second partially closed end 19. Ribs 39 contact core 9.

Figure 6:
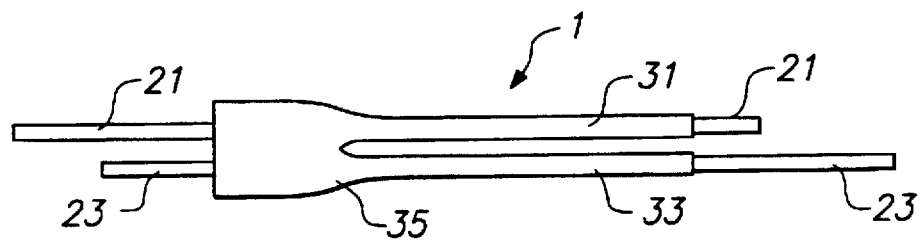
FIG. 6 is a top view of another embodiment of an apparatus of the invention.

FIG. 6 is a top view of apparatus 1 in which first and second guide tubes 21,23 are inserted into first and second leg portions 31,33, respectively, through first and second openings 25,27. The diameter of the guide tubes is less than that of the leg portions but greater than that of the first and second electrodes.

Though the invention has been described with regard to certain preferred embodiments thereof, it should be understood that the invention is not intended to be limited thereby. The various elements described can be combined as appropriate, and the invention is to be limited only by the appended claims.

What is claimed is:

1. An apparatus for sealing a core of an elongate cable comprising
   (A) first and second elongate electrodes, and
   (B) a polymeric core between said electrodes; said apparatus comprising a container which comprises
      (1) a first portion which
         (a) has a first open end into which the cable can be inserted, and a second partially closed end comprising (i) a first opening and (ii) a second opening, and
         (b) contains a sealant;
      (2) a first removable guide tube which is inserted through the first opening and is suitable for insertion suitable for insertion of the first elongate electrode; and
      (3) a second removable guide tube which is inserted through the second opening and is suitable for insertion of the second elongate electrode.

2. An apparatus according to claim 1 wherein the first and second guide tubes comprise a rigid material.

3. An apparatus according to claim 2 wherein the rigid material comprises plastic, ceramic, glass, metal, or paper.

4. An apparatus according to claim 1 wherein the first and second electrodes each have an outer diameter and the first and second guide tubes each have an inner diameter which is at least 1.1 times the outer diameter.

5. An apparatus according to claim 1 wherein the container comprises a flexible material.

6. An apparatus according to claim 5 wherein the flexible material comprises an elastomer.

7. An apparatus according to claim 6 wherein the elastomer comprises a silicone or a fluoropolymer elastomer.

8. An apparatus according to claim 5 wherein the first portion comprises (a) an interior surface and an exterior surface, and (b) a band positioned around the exterior surface.

9. An apparatus according to claim 8 wherein the band is a rigid band.

10. An apparatus according to claim 1 wherein the sealant comprises a grease or a gel.

11. An apparatus according to claim 10 wherein the sealant is a grease which comprises a silicone, fluorosilicone, or perfluoroalkylpolyether oil grease.

12. An apparatus according to claim 10 wherein the sealant is a gel which comprises a thermoplastic or a thermosetting gel.

13. An apparatus according to claim 1 wherein the first portion
   (a) is of generally tubular shape,
   (b) has an interior surface and an exterior surface, and
   (c) is attached at the second end to a second portion which comprises (i) a first leg portion which is connected to the first opening and which is suitable for insertion of the first guide tube, and (ii) a second leg portion which is connected to the second opening and which is suitable for insertion of the second guide tube.

14. An apparatus according to claim 13 wherein the interior surface comprises at least one rib.

15. An apparatus according to claim 1 wherein the apparatus is suitable for use with an elongate cable comprising a heating cable having a polymeric core comprising a conductive polymer.

16. An apparatus according to claim 1 wherein the container has a length and the first and second guide tubes each have a length at least 1.2 times the length of the container.

17. An assembly which comprises
   (A) an elongate cable comprising
      (1) first and second elongate electrodes, and
      (2) a polymeric core between said electrodes; and
   (B) an apparatus comprising a container which comprises
      (1) a first portion which
         (a) has a first open end into which the cable is inserted, and a second partially closed end comprising (i) a first opening and (ii) a second opening, and
         (b) contains a sealant;
      (2) a first removable guide tube which is inserted through the first opening and has inserted in it a polymer-free section of the first elongate electrode; and
      (3) a second removable guide tube which is inserted through the second opening and has inserted in it a polymer-free section of the second elongate electrode.

18. An assembly according to claim 17 wherein the cable is an elongate heating cable wherein the polymeric core comprises a conductive polymer composition.

* * * * *

UNITED STATES PATENT AND TRADEMARK OFFICE
CERTIFICATE OF CORRECTION

PATENT NO. : 5,767,448

INVENTOR(S) : Wesley B. Dong

DATED : June 16, 1998

It is certified that error appears in the above-identified patent and that said Letters Patent is hereby corrected as shown below:

Column 1, line 22, after "use" delete "to".

Column 5, lines 61 and 62, replace "1.1 x", "1.2 x", and "1.3 x" by --1.1x--, --1.2x--, and --1.3x-- respectively.

Column 6, lines 18 and 19, replace "1.2 y", "1.3 y", and 1.4 y" by --1.2y--, --1.3y--, and --1.4y-- respectively.

Claim 1, line 14, delete "suitable for insertion" (i.e. the second occurrence).

Signed and Sealed this

Twentieth Day of October, 1998

Attest:

BRUCE LEHMAN

Attesting Officer

Commissioner of Patents and Trademarks